United States Patent [19]

Dantis

[11] Patent Number: 5,075,615
[45] Date of Patent: Dec. 24, 1991

[54] COMBINED RECHARGING MOUNT AND STAND FOR ELECTRIC RAZORS

[76] Inventor: Theodore C. Dantis, 869 89th St., Marathon, Fla. 33050

[21] Appl. No.: 608,760

[22] Filed: Nov. 5, 1990

[51] Int. Cl.[5] .................. H02J 7/00; H01M 10/46
[52] U.S. Cl. ........................... 320/2; 439/217; 439/218; 439/221; 439/650; 439/651; 439/224
[58] Field of Search ............ 320/2; 439/217, 218, 439/221, 224, 638, 650, 651

[56] References Cited

U.S. PATENT DOCUMENTS

| | | | |
|---|---|---|---|
| 4,229,686 | 10/1980 | Mullersman et al. | 320/2 |
| 4,536,694 | 8/1985 | McCarty et al. | 320/2 |
| 4,645,995 | 2/1987 | Terrell et al. | 320/2 |
| 4,829,226 | 5/1989 | Nakamura et al. | 320/2 |

FOREIGN PATENT DOCUMENTS 3535564  5/1976  Fed. Rep. of Germany ...... 439/218
7600749  8/1976  Netherlands ........................ 439/221

Primary Examiner—Steven L. Stephan
Assistant Examiner—Thomas M. Dougherty
Attorney, Agent, or Firm—Schroeder & Siegfried

[57] ABSTRACT

A recharging mount for cordless rechargeable electric razors which plugs directly into an electric power receptacle and provides a stand in which the electric razor can be stored and recharged. The recharging mount has a pair of opposite facing storage cavities, each of which is capable of receiving and supporting the razor for recharging, and each of which has an electrical terminal which is connected to an external connector plug for providing recharging power to the electric razor when the razor is seated therewithin. The opposite facing storage cavities of the recharging mount enable the mount to be utilized with electric power receptacles which have a normal or an inverted orientation.

14 Claims, 2 Drawing Sheets

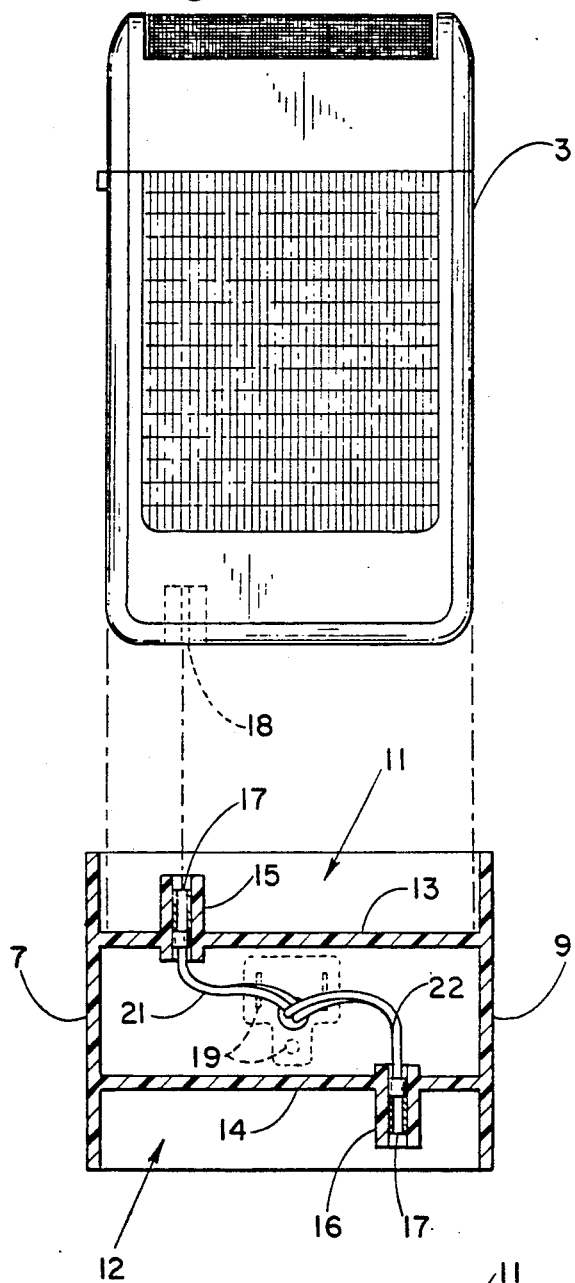
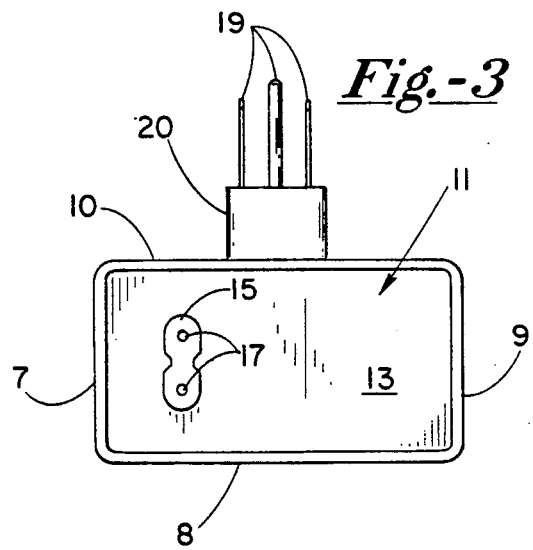
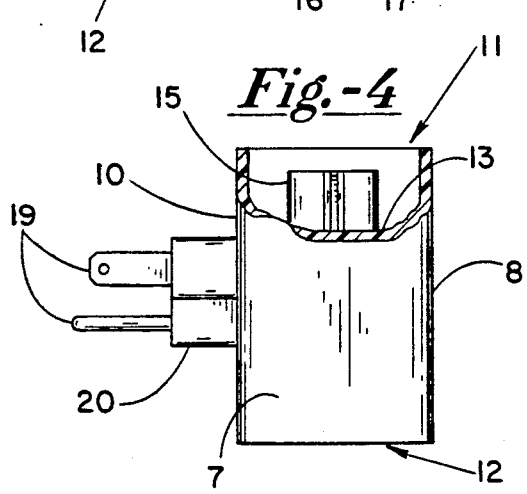
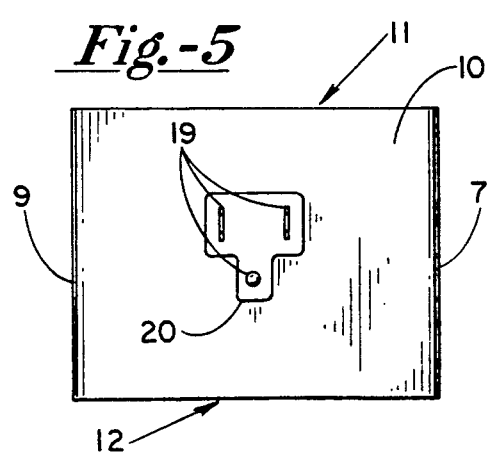

COMBINED RECHARGING MOUNT AND STAND FOR ELECTRIC RAZORS

BACKGROUND OF THE INVENTION

The invention described herein is generally related to the field of rechargeable electric razors, and more particularly to providing a truly cordless rechargeable mount and storage stand for an electric razor.

To meet the changing needs of consumers, it has always been a goal to make consumer products more efficient in cost, size, use, etc. With such goals in mind, technology has allowed us to advance from the use of straight edge razors to electric razors, and therefrom to the development of cordless rechargeable electric razors. However, current rechargeable razors are not truly cordless, since they are generally provided with an electrical cord which connects to the electric razor and plugs into an electrical power supply receptacle for recharging. As such, such rechargeable electric razors must lay out on the counter or in some other location while the razor recharges. When not in use, the electric cord must be disconnected and either stored in a drawer or left laying on a countertop. Use of such cords are cumbersome and inefficient.

Although it is desirable to have a truly cordless electric razor, which requires no cord for recharging the same, there are distinct problems associated with providing such a device. For instance, the electrical power supply receptacles are generally designed such that a plug connector must be inserted in a predetermined orientation in order to effect a proper connection. Such receptacles are often mounted in different orientations, however, such that the slots into which the prongs of the connector are inserted may be inverted from the common position. In the past, this problem has been avoided through the use of flexible electrical cords which can be twisted so as to meet the proper orientation for connection to the power supply receptacle. In order to eliminate the use of such an electrical cord, one must solve this problem of orientation.

From the above, it is evident that it would be desirable to eliminate the need for an electric cord for recharging electric razors, and to provide a recharging unit which can function in a normal orientation or inverted orientation, and also function as a permanent stand for the razor which does not need to be unplugged and stored away in a drawer when not in use. It is believed that the invention described herein solves all of the above problems, and meets the desires of the consumer to have a truly cordless electric razor.

SUMMARY OF THE INVENTION

In order to provide a rechargeable electric razor which can be stored and recharged without the use of an additional electric cord, I have developed a combinational recharging mount and stand.

The recharging mount is basically constructed of a lightweight body member made of an at least semi-rigid material, such as polyethylene or other plastic material. The body has opposite ends with sidewalls extending therebetween. At each of the opposite ends a cavity is formed which has inner dimensions that are designed so as to cooperatively receive an electric razor therein. Each cavity is provided with an electrical terminal which extends upwardly into the cavity so as to plug into the razor upon insertion thereof into one of the respective cavities. Each electrical terminal is electrically connected to an electrical connector plug, which is fixedly connected to the exterior surface of one of the sidewalls of the body of the recharging mount structure.

Because such cavities are formed on both opposite ends of the recharging mount, regardless of the orientation of the electric power supply receptacle (inverted or not), one of the cavities will be positioned such that the rechargeable electric razor can be inserted and stored therein during periods of non-use. Moreover, when the razor is not in use, it is continually recharging. Unlike the use of an electric cord, my combinational recharging mount and stand does not need to be unplugged and stored away when not in use. As such, with the use of my combinational recharging mount and stand, a truly cordless rechargeable electric razor can be provided, regardless of the orientation of the power supply receptacle.

BRIEF DESCRIPTION OF THE DRAWINGS

FIG. 2 is a front vertical sectional view of my new recharging mount and stand, showing how a rechargeable electric razor is stored therein and electrically connected thereto.

FIG. 3 is a top plan view of my new recharging mount and stand for an electric rechargeable razor, as taken along lines 3—3 in FIG. 1.

FIG. 4 is a side elevational view of my new recharging mount and stand for an electric rechargeable razor, having the top portion thereof broken away to show the electrical terminal which extends upwardly for connection with an electric razor which is to be inserted therein.

FIG. 5 is a rear elevational view of my new recharging mount and stand for an electric rechargeable razor, taken along lines 5—5 in FIG. 1 and showing the electrical connector plug which inserts into an electric power supply receptacle to provide power to the recharging mount.

DETAILED DESCRIPTION OF THE INVENTION

Figure 1:
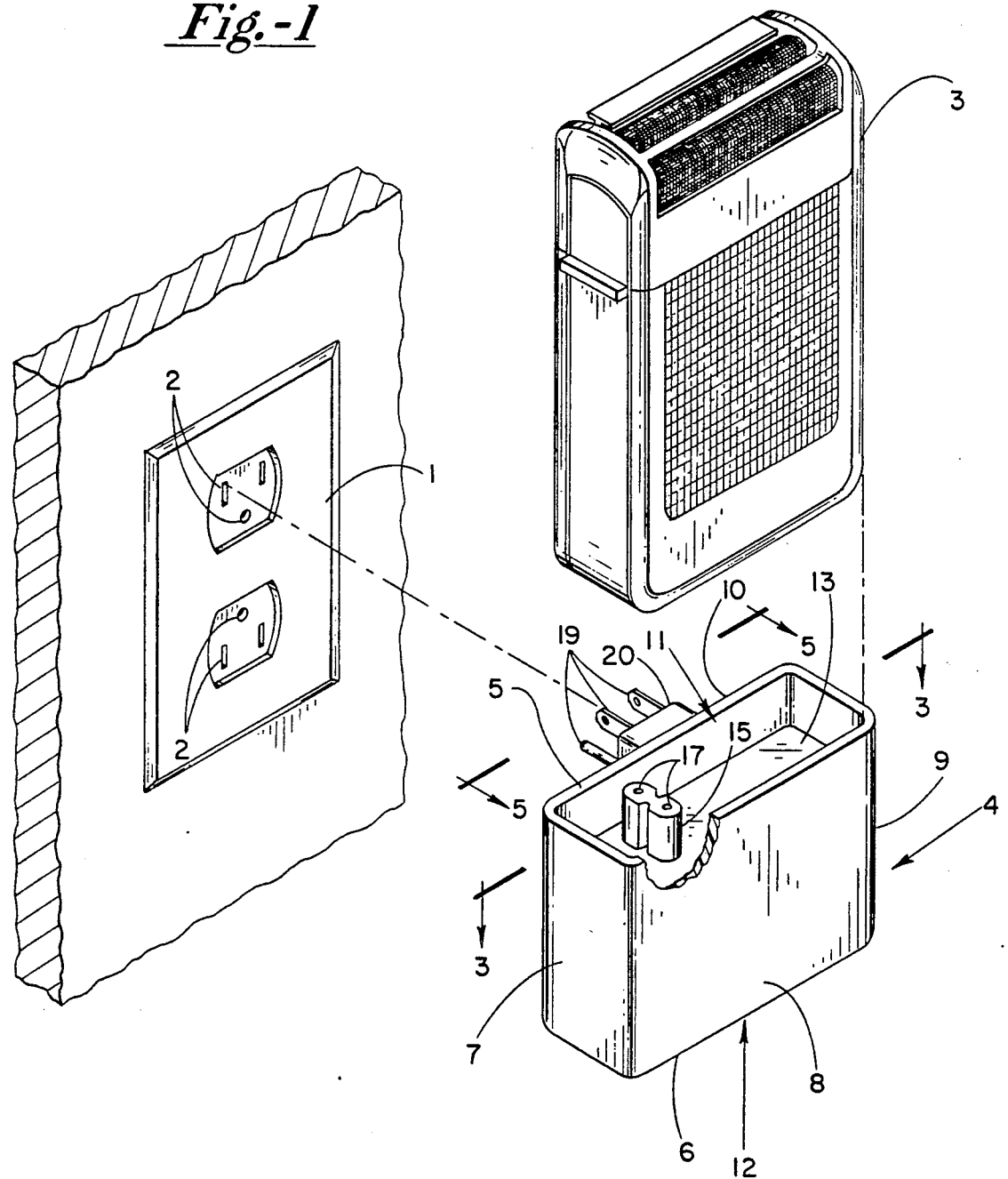
FIG. 1 is a perspective view of my new combinational recharging mount and stand, showing one possible orientation thereof for receipt of a rechargeable razor therein, and also showing a potential alternative orientation of a power supply receptacle which would require inversion of my recharging mount.

As is shown in FIG. 1, often times a power supply receptacle 1 will have its contact slots 2 in a normal orientation, or inverted (as shown in the bottom receptacle). In order to provide a truly cordless rechargeable electric razor 3, it is necessary to provide a means by which the rechargeable razor 3 can be stored and recharged, regardless of the orientation of the power supply receptacle 1 which is mounted in a wall. To provide such a system, I have invented an invertible combined recharging mount and stand 4 which can store and recharge such a rechargeable electric razor 3, regardless of the orientation of the power supply receptacle 1.

As shown in FIGS. 1-5, my new recharging mount 4 is generally comprised of an at least semi-rigid body structure which has opposite ends 5 and 6, with sidewalls 7, 8, 9 and 10 extending therebetween. Each of the opposite ends 5 and 6 of the recharging mount 4 form cavities, 1 and 12, respectively, which are constructed with inner dimensions designed to receive and support a rechargeable electric razor 3 therein. The body of recharging mount 4 is generally tubular, and cavities 11 and 12 are formed by cross members 13 and 14, respectively. As such, the recharging mount 4 is generally lightweight, since it is substantially hollow therewithin.

As best seen in FIGS. 2 and 3, each cross member 3 and 14 have connected thereto an outwardly projecting electrical terminal 15 and 16, respectively. Both electrical terminals have electric contacts 17 which are designed to receive therein pins 18 (only one shown in FIG. 2) of the rechargeable electric razor 3. Pins 18 are connected to the recharging circuit (not shown) of razor 3. Thus, insertion of the rechargeable razor 3 within either cavity 11 or 12 of the recharging mount 4 causes pins 18 to be inserted within contacts 17 of the respective terminal 15 or 16, thereby electrically connecting the razor thereto.

The contacts 17 of each electrical terminal 15 and 16 are electrically connected to the electrical contacts or prongs 19 of the electrical connector plug 20 via wires 21 and 22, respectively. As such, by insertion of the electrical contacts 19 of connector plug 20 within contact slots 2 of a power supply receptacle 1, electrical power is transferred through wires 21 and 22 to each electrical terminal 15 and 16. Depending upon the orientation of the contact slots 2 of the power receptacle 1, the rechargeable electric razor 3 can be inserted in cavity 11 or cavity 12 so as to position the razor 3 in an upstanding manner. Upon insertion of the rechargeable razor 3 within the respective cavities 11 or 12, electrical power is automatically supplied through the respective terminal 15 or 16 to razor 3.

Regardless of whether the contact slots 2 are in their normal orientation, or inverted, use of my new recharging mount and stand will allow the user thereof to store and recharge their rechargeable razor 3 without the need for a cumbersome electrical cord. As no storage of the electrical cord is needed, my new recharging mount can be permanently mounted within a wall receptacle for easy and frequent access thereto. The use of my new recharging mount and stand provides for a truly cordless rechargeable razor which can be utilized with any power receptacle, regardless of the orientation thereof. Although it is not necessary to use a three prong connector plug 20, use of such a three prong connector is preferred, since such a system provides for more stability to support the weight of the rechargeable electric razor 3.

In considering this invention, it should be remembered that the present disclosure is illustrative only and the scope of the invention should be determined by the appended claims.

What is claimed is:

1. A recharging mount for a rechargeable cordless electric razor which plugs directly into the contact slots of an electric power supply receptacle comprising:
   a) an at least semi-rigid structure having opposite ends with sidewalls therebetween and having a first cavity disposed at one of said ends, and a second cavity disposed at said opposite end, each said cavity being constructed and arranged to receive and support the razor therein for recharging;
   b) an electrical connector mounted directly on one of said sidewalls of said structure, said connector having a plurality of prongs constructed and arranged to be telescopically inserted in cooperative relation within the contact slots of the electric power supply receptacle, and to receive electrical power therefrom;
   c) a first electrical terminal connected to said structure within said first cavity, said first terminal being electrically connected to said electrical connector so as to receive electrical power therefrom when said connector is plugged into the power supply receptacle;
   d) a second electrical terminal connected to said structure within said second cavity, said second terminal being electrically connected to said electrical connector so as to receive electrical power therefrom when said connector is plugged into the power supply receptacle; and
   e) said first terminal being constructed and arranged to electrically connect to the razor upon insertion of the razor within said first cavity, and said second terminal being constructed and arranged to electrically connect to the razor upon insertion of the razor within said second cavity, thereby recharging the razor upon insertion thereof within either of said cavities.

2. The structure defined in claim 1, wherein said first cavity has a base portion to which said first terminal is connected and said second cavity has a base portion to which said second terminal is connected, said first terminal extending outwardly away from said base portion to which it is connected into said first cavity and said second terminal extending outwardly away from said base portion to which it is connected into said second cavity, each of said terminals providing a plug which is insertible within the razor for electrical connection thereto.

3. The structure defined in claim 1, wherein said sidewalls of said structure define and second cavities on said opposite ends thereof.

4. The structure defined in claim 1, wherein said first and second cavities open opposite each other and the respective said cavity into which the razor is to be inserted is dependent upon the orientation of said structure when said connector is plugged into the electric power supply receptacle.

5. The structure defined in claim 1, wherein said first terminal comprises an outward protrusion from within said first cavity which has contact members that electrically engage the razor upon insertion of the razor within aid first cavity, and wherein said second terminal comprises an outward protusion from within said second cavity which has contact members that electrically engage the razor upon insertion of the razor within said second cavity.

6. The structure defined in claim 1, wherein said electrical connector is rigidly attached to one of said sidewalls of said structure.

7. The structure defined in claim 1, wherein said electrical connector has at least three said prongs outwardly therefrom.

8. A recharging mount for a cordless rechargeable electric razor, comprising:
   a) an at least semi-rigid structure having opposite ends with sidewalls therebetween and having a first cavity disposed at one of said ends, and a second cavity disposed at said opposite end, said first and second cavities each being constructed and arranged to receive and support the razor therein for recharging;
   b) an electrical connector fixedly mounted on said structure, said connector having a plurality of outwardly extending contacts which are constructed and arranged for cooperative insertion within a plurality of contact slots in an electric power supply receptacle, thereby causing electrical power transmission between said receptacle and said connector;

c) said structure having means connected thereto for transmitting electrical power from said connector to the razor when the razor is received within either said first or second cavity.

9. The structure defined in claim 8, wherein said means for transmitting electrical power from said connector to the razor when the razor is received within either said first or second cavity comprises a first contact terminal connected to said structure and extending outwardly into said first cavity and a second contact terminal mounted to said structure and extending outwardly into said second cavity, said first and second terminals being electrically connected to said electrical connector, said first terminal having means for transmitting electrical power received from said receptacle through said connector to the razor when the razor is received within said first cavity, and said second terminal having means for transmitting electrical power received from said receptacle through said connector to the razor when the razor is received within said second cavity.

10. The structure defined in claim 9, wherein said first and second terminals constitute plugs which are insertable within the razor for electrical connection thereto.

11. The structure defined in claim 8, wherein said connector has three said contacts extending outwardly therefrom which are cooperatively insertable within three said contact slots in said receptacle to receive electrical power therefrom.

12. A recharging mount for a cordless rechargeable electric razor, comprising:

a) an at least semi-rigid structure having opposite end portions with sidewalls therebetween, said opposite end portions each having means for supporting the razor and electrically connecting the razor to an electrical connector which is fixedly secured to said structure; and b) said electrical connector having a plurality of contacts which are constructed and arranged for cooperative telescopic insertion within a plurality of contact slots in an electric power supply receptacle, thereby causing electric power to be transmitted from said power supply receptacle to said connector and consequently to said opposite end portions of said structure.

13. The structure defined in claim 12, wherein one of said end portions define a first cavity and said opposite end portion defines a second cavity, said first and second cavities each being constructed and arranged to cooperatively receive and support the razor therein for electrical connection thereto.

14. The structure defined in claim 13, wherein said means at each of said opposite ends for electrically connecting the razor to said electrical connector comprises a first and second terminal, said first terminal extending outwardly from said structure into said first cavity and said second terminal extending outwardly from said structure into said second cavity, each said terminal having electrical contacts which electrically engage the razor upon insertion of the razor within said respective first or second cavity, said electrical contacts in each said terminal being electrically connected to said connector.

* * * * *

UNITED STATES PATENT AND TRADEMARK OFFICE
CERTIFICATE OF CORRECTION

PATENT NO.  : 5,075,615
DATED       : December 24, 1991
INVENTOR(S) : Theodore C. Dantis It is certified that error appears in the above-identified patent and that said Letters Patent is hereby corrected as shown below:

Column 3, line 7, after "member" change "3" to --13--.

Column 4, line 35, after "define" add --said first--.

Column 4, line 47, change "aid" to --said--.

Column 4, line 56, after "prongs" add --extending--.

Signed and Sealed this

Sixth Day of April, 1993

Attest:

STEPHEN G. KUNIN

*Attesting Officer*    Acting Commissioner of Patents and Trademarks